United States Patent [19]

Graham

[11] Patent Number: 5,705,792
[45] Date of Patent: Jan. 6, 1998

[54] DIGITAL TEMPERATURE SENSING CONDITIONING AND SAFETY SYSTEM WITH CURRENT CONTROL

[75] Inventor: Donald W. Graham, Grand Haven, Mich.

[73] Assignee: Robertshaw Controls Company, Richmond, Va.

[21] Appl. No.: 617,172

[22] Filed: Mar. 18, 1996

[51] Int. Cl.$^6$ ........................................ H05B 1/02
[52] U.S. Cl. ...................... 219/497; 219/499; 219/413; 219/505; 219/501
[58] Field of Search ........................ 219/492, 413, 219/497, 411, 501, 412, 499, 505, 504; 307/117, 119

[56] References Cited

U.S. PATENT DOCUMENTS

| | | |
|---|---|---|
| 3,519,797 | 7/1970 | Kjellberg . |
| 3,875,372 | 4/1975 | Gilliom . |
| 3,899,656 | 8/1975 | Smith . |
| 4,197,442 | 4/1980 | Carlsson et al. ............... 219/10.55 B |
| 4,316,079 | 2/1982 | Schmitz . |
| 4,549,074 | 10/1985 | Matsuo ............................ 219/505 |
| 4,626,663 | 12/1986 | Tateda . |
| 4,692,598 | 9/1987 | Yoshida et al. . |
| 5,040,724 | 8/1991 | Brinkruff et al. ................ 219/501 |
| 5,053,605 | 10/1991 | Thorax et al. ................... 219/501 |
| 5,220,153 | 6/1993 | Malone et al. . |
| 5,308,957 | 5/1994 | Huffington . |
| 5,317,130 | 5/1994 | Burkett et al. . |
| 5,345,064 | 9/1994 | Hesse . |
| 5,440,103 | 8/1995 | Martin . |

Primary Examiner—Mark H. Paschall
Attorney, Agent, or Firm—Fulbright & Jaworski LLP

[57] ABSTRACT

A temperature sensing system that includes a temperature probe, a signal conditioning circuit, and a microprocessor. The conditioning circuit incorporates a novel dual voltage range measurement technique that improves the accuracy of such systems. The safety circuitry is provided in order to protect against thermal runaway and to inhibit or enable a door lock.

7 Claims, 3 Drawing Sheets

DIGITAL TEMPERATURE SENSING CONDITIONING AND SAFETY SYSTEM WITH CURRENT CONTROL

BACKGROUND OF THE INVENTION

1. Field of the Invention

The present invention relates to temperature sensing probes and, more particularly, to circuitry for conditioning the probe signal, as well as circuitry to monitor the safety of an oven cavity.

2. Description of the Related Technology

Typically, in such cooking ovens, a temperature sensing probe detects the temperature of the air in the oven and turns the heating element on or off, depending on whether the sensed temperature is above or below the user-selected regulation temperature.

Some of the circuits in the past have included a capacitor charge time measurement wherein the probe is utilized as part of an RC timing network. This particular technique, while inexpensive, is highly inaccurate. Other techniques incorporate pulse width modulation and the measurement of resistive characteristics that change with temperature. While such techniques are simple, they are not very accurate and develop substantial problems at low voltages.

A further problem with the resistive measurement technique is that the current supplied to the resistance temperature detector will vary, creating an increase or decrease in the power dissipation of the part itself.

In U.S. Pat. No. 5,308,957, a control system for dual oven resistance heaters is disclosed that has opposite sides of each heater connected to a common side of one of a pair of single-pole, double-throw switching relays, such that no current flows to the heaters when both relays are in a common state of energization. In U.S. Pat. No. 5,345,064, a temperature probe conditioner is disclosed that has a verify output to check the correctness of the conditioner's output voltage and a calibration output to confirm the range of the conditioner as well as to calibrate the port of an external circuit.

SUMMARY OF THE INVENTION

The intent of the present circuitry is to provide a novel and more accurate means of converting a temperature variable resistance measurement of voltage into a heat control signal for ovens. Also, this system includes novel safety circuitry in the event of thermal-runaway and to inhibit or enable a door lock.

It is, therefore, an object of the present invention to provide a more accurate temperature sensing in an oven cavity.

Another object of the invention is to provide safety circuitry for detection of thermal-runaway in the oven cavity.

Thus, in accordance with one aspect of the present invention, there a temperature sensing system is provided, comprising at least a temperature sensing probe; a signal conditioning circuit connected to the temperature sensing probe; a safety circuit connected to the signal conditioning circuit; and, a microprocessor connected to the signal conditioning circuit and the safety circuit.

Preferably, the signal conditioning circuit includes at least a first operational amplifier that operates as a voltage-to-current converter; a resistance temperature detector producing different resistance values in response to present different temperatures connected to the output of the first operational amplifier and to the input of the first operational amplifier; a first resistor connected to the resistance temperature detector; a voltage source connected to the first operational amplifier and to the first resistor; a second operational amplifier operating as a difference amplifier; a second resistor connected to the input of the second operational amplifier and to the first resistor; a switch means connected to the second resistor; a third resistor connected to the input of the second operational amplifier and to the switch means; a fourth resistor connected to the input of the second operational amplifier and the second end connected to the output of a second voltage source.

According to a preferred embodiment, the signal conditioning circuit operates as a constant current source for the temperature sensing probe.

With respect to additional preferred embodiments, the second operational amplifier output is an amplification of the difference between the two inputs of the second operational amplifier.

Preferably, the safety circuit includes at least a third operational amplifier that operates as a comparator with one input connected to the first voltage source; a fourth operational amplifier that operates as a comparator with one input connected to the first voltage source; a fifth resistor connected to the output of the second operational amplifier and to the input of the third operational amplifier; a sixth resistor connected to the input of the third operational amplifier and to a second switch; a seventh resistor connected to the output of the second operational amplifier and to the input of the fourth operational amplifier; an eighth resistor connected to the second switch and to the input of the fourth operational amplifier; and a ninth resistor connected to the second input of the fourth operational amplifier and to the second switch means.

Preferably, the third operational amplifier operates as a comparator between the first reference voltage and the potential between the fifth and sixth resistors. Also, preferably, the fourth operational amplifier operates as a comparator between the first reference voltage and the potential between the seventh and the ninth resistors.

Additionally, the microprocessor may be connected to the outputs of the second, third, and fourth operational amplifiers.

Further objects, features and advantages will be apparent from the following description of a presently preferred embodiment of the invention, given for the purpose of disclosure and taken in conjunction with the accompanying drawing.

DETAILED DESCRIPTION OF PREFERRED EMBODIMENTS

Figure 1:
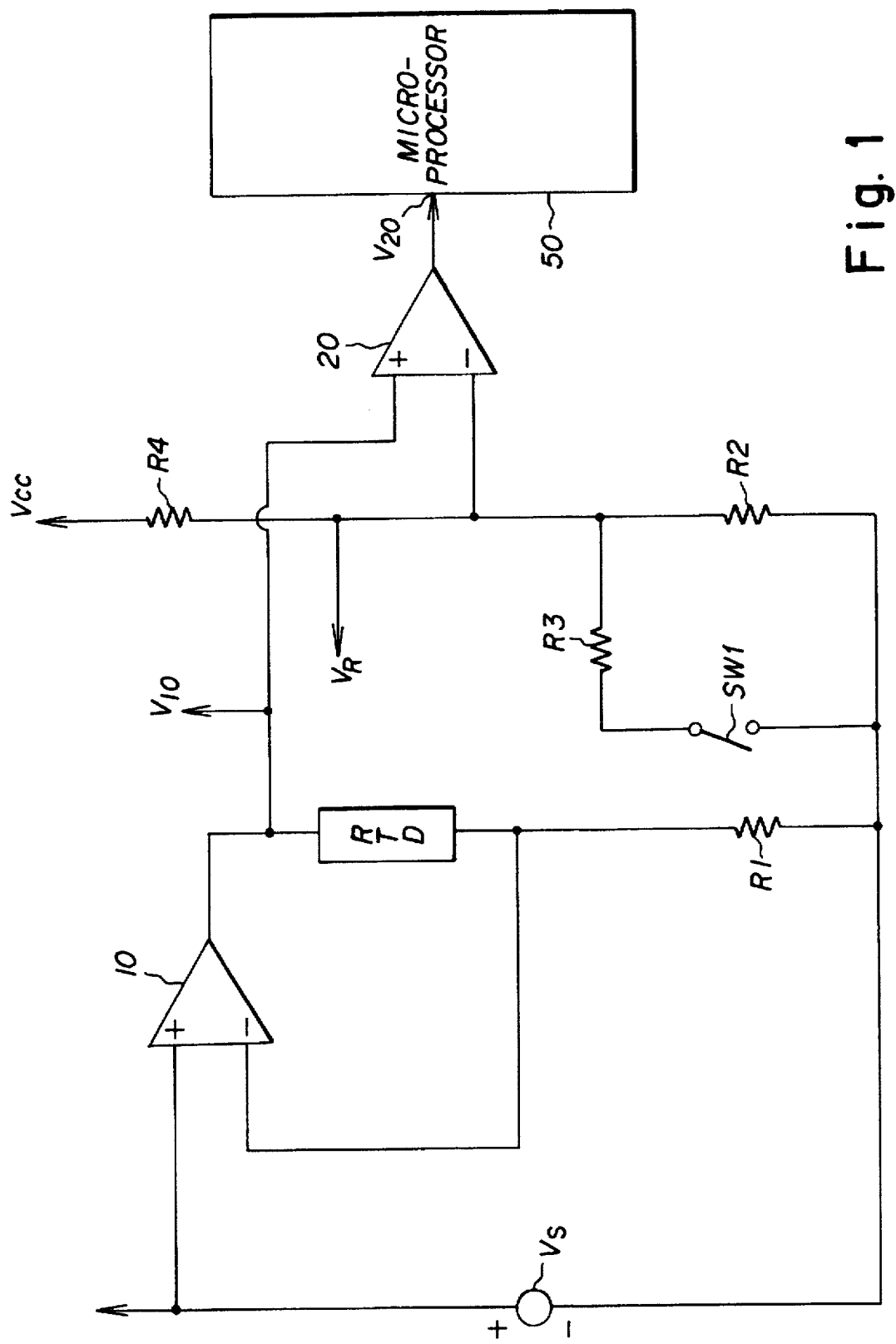
FIG. 1 is a schematic representation of the signal conditioning circuit for the present invention.

Referring now to the drawings, FIG. 1 shows the signal conditioning circuit, along with the resistance thermal detector ("RTD") and the microprocessor 50. The RTD is the oven temperature sensor. This circuitry converts the resistance changes of the RTD to a voltage and amplifies the signal for interpretation by the microprocessor 50. In the preferred embodiment, this circuitry is designed to condition the signal for the 0–5 vdc. Also in the preferred embodiment, an oven cavity would contain two of these circuits, with each conversion circuit being simply a duplicate of the other, and both are functionally identical in operation.

The RTD is located in the feedback loop of the first stage operational amplifier 10. One end of the RTD is connected to the first resistor R1, while the other end is connected to the output of the amplifier 10. A constant voltage source $V_S$ is applied to the non-inverting side of the first amplifier 10. The negative potential of the voltage source $V_S$ is connected to the other end of the first resistor R1. In this configuration, the potential voltages at the inputs of the first amplifier 10 are equal. Therefore, the current through the first resistor R1 is constant at $V_S/R1$. Next, considering that no current flows into either input of the first amplifier 10, then the currents through the first resistor R1 and the RTD must be equal. Therefore, the current through the RTD must also be equal to $V_S/R1$, and furthermore, this current is independent of the RTD resistance value.

Because of this constant current through the RTD, the accuracy of the system is improved. One of the problems with temperature monitoring in previous systems is that the current supplied to the RTD would vary, thus creating an increase or decrease in the power dissipation of the RTD itself. As seen by the equation $I^2R=P_d$, the current flow has an exponential effect on the power dissipation. However, if the current is held constant, as is done here in the preferred embodiment, the effects of the power dissipation of the RTD are directly proportional to the value of the first resistor R1, and not the square of the current supplied.

The first operational amplifier 10 of the conditioning circuit is referred to as a voltage-to-current converter. In the present invention, a constant current is supplied to the RTD, and consequently, as the RTD changes in resistive value, a proportional voltage change is present at the output $V_{10}$ of the first amplifier 10. This output $V_{10}$ is calculated as follows: $V_{10}=V_S((RTD/R_S)+1)$.

The second stage of the conditioning circuit is a difference amplifier, which is the second operational amplifier 20. The voltage to the non-inverting input of the second amplifier 20 is the output voltage $V_{10}$ of the first operational amplifier 10. Both the inverting and the noninverting inputs of the second amplifier 20 are balanced with one another, and are configured for a voltage gain such as A=4 in the preferred embodiment. The fourth resistor R4 is connected between the inverting input of the second amplifier 20 and a second voltage source $V_{CC}$. A resistor network is also connected to the inverting input of the second amplifier 20, between the input and the junction of the first resistor R1 and the negative potential of the voltage source $V_S$. In the preferred embodiment, this network comprises a second resistor R2 in parallel with a series connection of a switch SW1 and a third resistor R3.

The equation for the output voltage $V_{20}$ of the second operational amplifier 20 is as follows: $V_{20}=(V_{10}-V_R)A$, where $V_{10}$ is the output of the first operational amplifier 10, A is the gain of four from the second amplifier 20, and $V_R$ is the range voltage of the system, taken at the inverting input of the second amplifier 20. In the present invention, a dual range system is created by switching in two different values for $V_R$. The switch SW1 provides this function by creating two voltage divider circuits. $V_R$ ranges 1 and 2 are calculated as follows:

$$V_{R1}=V_{CC}(R2\|R3/(R1+(R2\|R3))), \quad V_{R2}=V_{CC}(R2/(R1+R2)).$$

Figure 3:
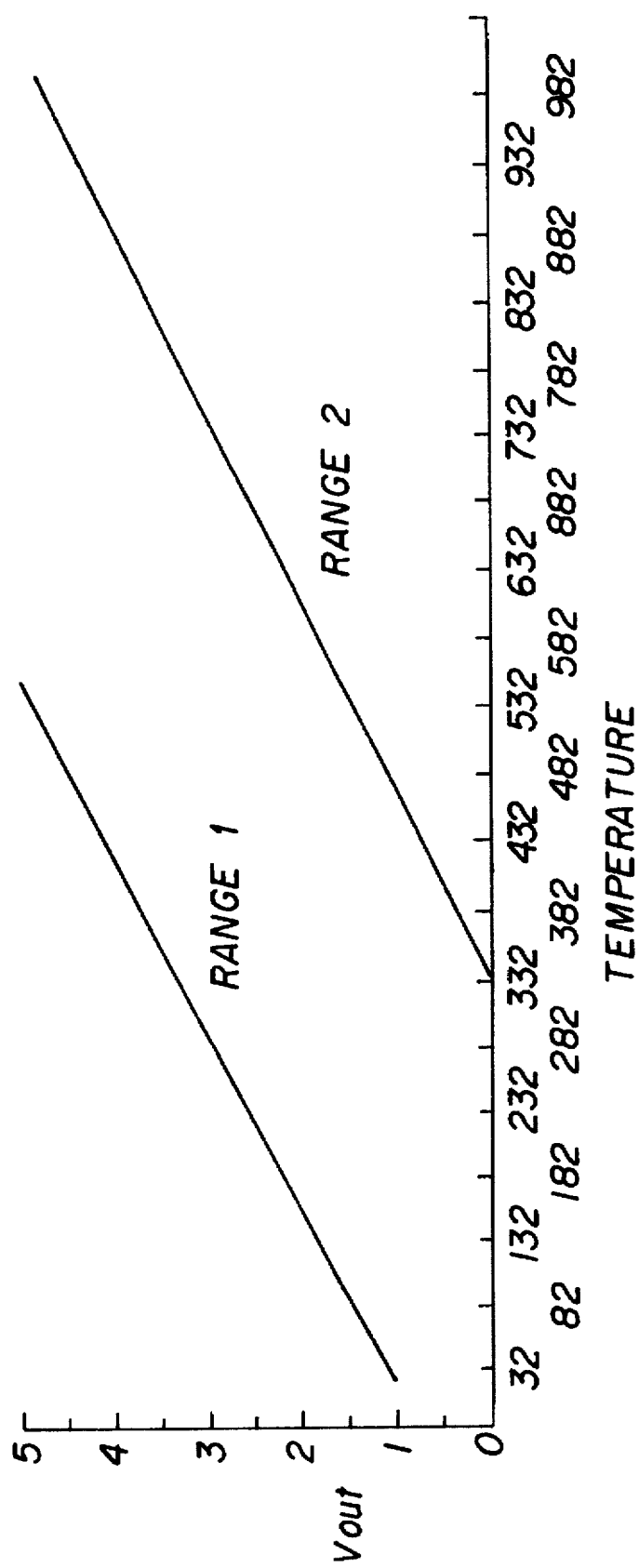
FIG. 3 is a graph of theoretical response of the range voltage output versus the temperature input.

A dual range system is a novel method of improving the accuracy of the temperature measurement system. This system allows an accuracy of 5 degrees Fahrenheit over a 1000 degree range. Another advantage of the dual range approach is that component failures within the conversion circuitry are easily detected. FIG. 3 is a graphical representation of the theoretical response of the RTD conversion circuit for both ranges.

The output voltage $V_{20}$ of the second operational amplifier 20 is an input for the microprocessor 50.

Figure 2:
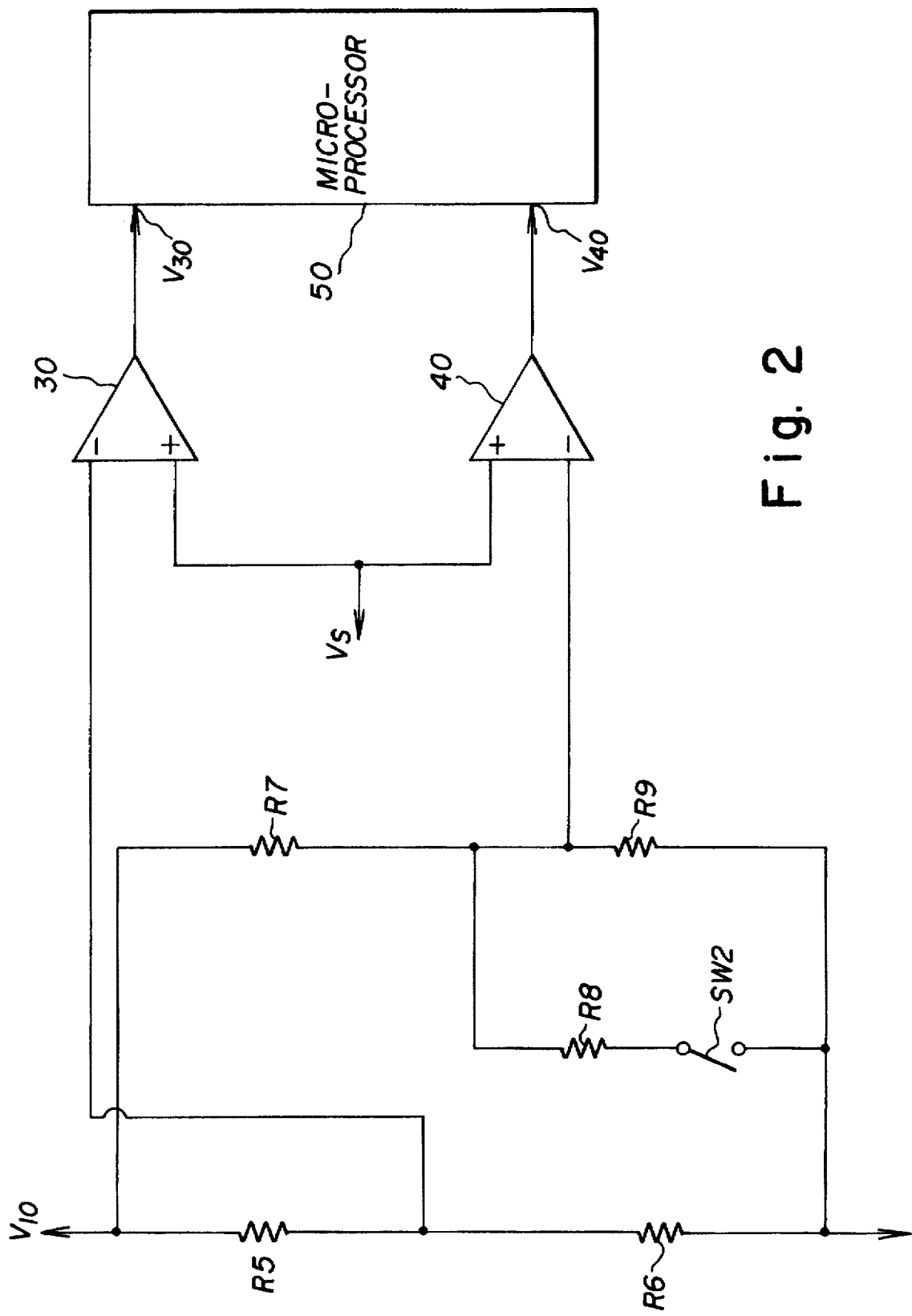
FIG. 2 is a schematic representation of the signal conditioning circuit for the present invention.

FIG. 2 shows a schematic diagram of the safety circuit. The primary elements are two comparators, a resistor network, and the microprocessor 50. The safety circuitry is incorporated as a fail safe for the oven control. In the preferred embodiment, there are two identical sets of safety circuitry, one for each of the two RTD sensors.

In the preferred embodiment, the safety circuitry performs two functions. First, it either inhibits or enables the motorized door lock operation. Second, it disables the watch dog if a runaway condition is detected which will shut down the oven.

Both comparators, the third operational amplifier 30 and the fourth operational amplifier 40, use the voltage source $V_S$ as a reference voltage. The voltage source $V_S$ is connected to the non-inverting inputs of both comparator 30 and comparator 40. Also, for both comparator circuits, the voltage source $V_S$ is compared against the output voltage $V_{10}$ from the first operational amplifier 10, after the voltage $V_{10}$ is divided by the resistor network. Comparator 30 and comparator 40 use a different portion of $V_{10}$ in the comparison.

A fifth resistor R5 and a sixth resistor R6 are connected in series together between the output voltage $V_{10}$ of the first operational amplifier 10. The inverting input of the comparator 30 is connected to this junction between the fifth resistor R5 and the sixth resistor R6. The output voltage $V_{30}$ of the comparator 30 is an input for the microprocessor 50.

In the preferred embodiment, this output voltage $V_{30}$ is used to determine whether a door locking mechanism temperature limit is reached in the oven. When this limit is reached, the motorized door lock is inhibited from operation above a specified temperature. When the door lock limit is reached, the door should be locked, and it will remain locked until a safe operation temperature is met due to the disabling of the operation of the lock motor. The theoretical value of the RTD for the door lock limit is calculated as follows: $R_{rtd}=R1((R5+R6)/R6-1)$. According to one embodiment, the theoretical switching point for the RTD resistance is 2208 ohms, or approximately 635 degrees Fahrenheit. Therefore, the motorized door lock will operate at temperatures below 635 degrees Fahrenheit, however, the locking system is inhibited from operation at temperatures greater than or equal to 635 degrees Fahrenheit.

The inverting input of the fourth operational amplifier 40 is connected to a seventh resistor R7. The other end of the seventh resistor is connected to the output voltage $V_{10}$ of the first operational amplifier 10. A second switch SW2 is connected to the sixth resistor R6 on one side, and on the other, the switch SW2 is connected to an eighth resistor R8. The eighth resistor R8 is then connected to the inverting input of the comparator 40. A ninth resistor R9 is also connected to the inverting input of the comparator 40. The other end of the ninth resistor R9 is connected to the junction of the second switch SW2 and the sixth resistor R6. The output voltage $V_{40}$ of the comparator 40 is an input to the microprocessor 50.

In the preferred embodiment, this output voltage $V_{40}$ is used to check an over-temperature limit for an oven, which is an over-temperature runaway limit. The over-temperature limit disables the watch-dog if the oven temperature exceeds a safe level. In an embodiment that is coupled with an oven that provides self-cleaning functions, two over-temperature limits based on the status of the door lock input are needed. The second switch SW2 is controlled by the door lock status input, which the output voltage $V_{30}$ from the third operational amplifier 30. When the switch SW2 is closed, the door is locked and clean temperatures in the oven cavity are permitted. The theoretical value of the RTD for the oven-temperature limits are calculated as follows: Unlocked: $R_{rtd}$=R1((R7+R9)/R9-1); Locked: $R_{rtd}$=R1((R7+R9||R8)/(R9||R8)-1). According to one embodiment the theoretical unlocked switching point may be reached when the RTD resistance is 2208 ohms, or approximately 635 degrees Fahrenheit. Therefore, if the temperature of the RTD ever reaches 635 degrees Fahrenheit while the door is unlocked, the watch dog circuit will be disabled and all heating operation cancelled. The theoretical locked switching point is when the RTD resistance is 2829 ohms, or approximately 975 degrees Fahrenheit. Therefore, if the temperature of the RTD ever reaches 975 degrees Fahrenheit, the watch dog circuit is disabled and the heating operation is canceled.

The present invention, therefore, is well adapted to carry out the objects and obtain the ends and advantages mentioned as well as others inherent therein. While presently preferred embodiments of the invention have been given for the purpose of disclosure, numerous changes in the details of construction and arrangement of parts will be readily apparent to those skilled in the art and which are encompassed within the spirit of the invention and the scope of the appended claims.

What is claimed is:

1. A temperature sensing system, comprising:

a signal conditioning circuit connected to a temperature sensing probe; wherein said signal conditioning circuit creates a first signal to control a heater device in response to an input from said temperature sensing probe based on an external variable temperature measurement;

a safety circuit connected to said signal conditioning circuit; wherein said safety circuit creates a second signal that operates to disable an oven door lock device above a first maximum temperature level and creates a third signal that operates to disable an oven heater device above a second maximum temperature level; and, a microprocessor connected to said signal conditioning circuit and said safety circuit.

2. A temperature sensing system according to claim 1, wherein said signal conditioning circuit further comprises:

a first voltage source;

a first operational amplifier stage connected to said first voltage source; wherein said first operational amplifier stage is a voltage-to-current converter; wherein said temperature sensing probe further comprises a resistance temperature detector; wherein said first operational amplifier stage converts the resistance change of said resistance temperature detector into a proportional first voltage signal;

a second operational amplifier stage connected to said first operational amplifier stage and a second voltage source; wherein said second amplifier stage is a difference amplifier that compares said second voltage source to a second voltage signal to create said first signal; wherein said second voltage signal is created by dual resistor network voltage divider circuits which include a first switch device to select one circuit at a time and divide said second voltage source.

3. A temperature sensing system according to claim 2, wherein said safety circuit further comprises:

a third operational amplifier stage connected to said first voltage source; wherein said third operational amplifier stage is a comparator that compares said first voltage source to a third voltage signal to create said second signal; wherein said third voltage signal is created by dual resistor network voltage divider circuits which divide said first voltage signal; and a fourth operational amplifier stage connected to said first voltage source; wherein said fourth operational amplifier stage is a comparator that compares said first voltage source to a fourth voltage signal to create said third signal; wherein said fourth voltage is created by dual resistor network voltage divider circuits which include a second switch device to select one circuit at a time and divide said first voltage signal.

4. A signal conditioning circuit, comprising:

a voltage source;

a first operational amplifier stage connected to said voltage source; wherein said first operational amplifier stage is a voltage-to-current converter;

a temperature sensing probe connected to said first operational amplifier stage; wherein said temperature sensing probe further comprises a resistance temperature detector that is located in a feedback loop of said first operational amplifier stage; wherein said first operational amplifier stage operates to convert a resistance change of said resistance temperature detector into a proportional first voltage signal; and a second operational amplifier stage connected to said first operational amplifier stage and a second voltage signal; wherein said second operational amplifier stage is a difference amplifier that compares said second voltage signal to said proportional first voltage signal to create an output signal to control an oven heater device; wherein said second voltage signal is created by a second voltage source and resistor network voltage divider circuits which include a switch device to divide said second voltage source.

5. A safety circuit, comprising:

a first operational amplifier stage connected to a first voltage source; wherein said first operational amplifier stage is a comparator that compares said first voltage source to a first voltage signal to create a first digital signal to control an oven door lock device; wherein said first voltage signal is created by a resistor network voltage divider circuit which divides a second voltage source; and a second operational amplifier stage connected to said first voltage source; wherein said second operational amplifier stage is a comparator that compares said first voltage source to a second voltage signal to create a second digital signal to control an oven temperature limiting device; wherein said second voltage signal is created by dual resistor network voltage divider circuits which include a switch device to select one circuit at a time and divide said second voltage signal.

6. A method for converting an input temperature signal into output voltage signals, the method comprising:

receiving an input temperature signal;

applying said input temperature signal to a temperature sensing probe to create a proportional resistance value in said probe;

applying said resistance value to a first operational amplifier stage that is a voltage-to-current converter to convert said resistance value into a proportional first voltage signal;

applying a first voltage source to two resistor network voltage divider circuits which include a first switch device to select one circuit at a time and divide said voltage source signal to create a second voltage signal;

applying said first voltage signal to a second operational amplifier that is a difference amplifier to convert said first voltage signal into a third voltage signal by comparing said first voltage signal to said second voltage signal;

processing said third voltage signal into a digital signal to control an oven heater device;

applying said first voltage signal to a resistor network to create a fourth voltage signal;

applying said first voltage source to a third operational amplifier stage that compares said first voltage source with said fourth voltage signal to create a fifth voltage signal;

processing said fifth voltage signal into a digital signal to control an oven door lock device;

applying said first voltage signal to dual resistor voltage divider circuits which include a second switch device to select one circuit at a time and divide said first voltage signal to create a sixth voltage signal;

applying said first voltage source to a fourth operational amplifier stage that compares said first voltage source with said sixth voltage signal to create a seventh voltage signal; and processing said seventh voltage signal into a digital signal to control an oven heater over-temperature limit device.

7. A temperature sensing system, comprising:

a temperature sensor, wherein said temperature sensor means is a resistance temperature detector;

a first operational amplifier connected to said temperature sensor and a first voltage source, wherein said first operational amplifier includes a voltage-to-current converter with an output proportional to the temperature sensor output;

a second operational amplifier connected to said first operational amplifier, wherein said second operational amplifier converts said first operational amplifier output into a third voltage signal by comparing said first operational amplifier output to a second voltage signal;

a dual resistor network voltage divider circuit connected to said second operational amplifier, said divider circuit including a first switch for selecting one circuit at a time and dividing said first voltage source to create said second voltage signal;

a third operational amplifier connected to said first voltage source; wherein said third operational amplifier compares said first voltage source with a fourth voltage signal to create a fifth voltage signal; wherein said third operational amplifier is connected to a dual resistor network voltage divider circuit for processing said first voltage signal into said fourth voltage signal; and a fourth operational amplifier connected to said first voltage source; wherein said fourth operational amplifier compares said first voltage source with a sixth voltage signal to create a seventh voltage signal; wherein said fourth operational amplifier is connected to a dual resistor voltage divider circuit which includes a second switch for selecting one circuit at a time and dividing said first voltage signal to create said sixth voltage signal; and a processor connected to said second, third and fourth operational amplifier; wherein said processor converts said third voltage signal into a first digital signal to control an oven heater and converts said fourth voltage signal into a second digital signal to control an oven door lock, and converts said seventh voltage signal into a third digital signal to control an oven heater over-temperature limit.

* * * * *